United States Patent
Schäfer et al.

(10) Patent No.: US 8,041,142 B2
(45) Date of Patent: Oct. 18, 2011

(54) METHOD AND DEVICE FOR RECONSTRUCTING IMAGES

(75) Inventors: Lutz Schäfer, Kitchener (CA); Dietwald Schuster, Bad Abbach (DE)

(73) Assignee: Carl Zeiss Imaging Solutions GmbH, Hallbergmoos (DE)

( * ) Notice: Subject to any disclaimer, the term of this patent is extended or adjusted under 35 U.S.C. 154(b) by 839 days.

(21) Appl. No.: 12/091,867

(22) PCT Filed: Oct. 27, 2006

(86) PCT No.: PCT/EP2006/010374
§ 371 (c)(1),
(2), (4) Date: Apr. 28, 2008

(87) PCT Pub. No.: WO2007/051566
PCT Pub. Date: May 10, 2007

(65) Prior Publication Data
US 2008/0292135 A1 Nov. 27, 2008

(30) Foreign Application Priority Data
Nov. 1, 2005 (DE) .......................... 10 2005 052 061

(51) Int. Cl.
*G06K 9/40* (2006.01)

(52) U.S. Cl. ........ 382/260; 382/274; 382/275; 382/282; 358/3.26; 358/3.27; 358/463

(58) Field of Classification Search .................. 382/260, 382/274, 275, 282
See application file for complete search history.

(56) References Cited

U.S. PATENT DOCUMENTS

| | | | | |
|---|---|---|---|---|
| 6,166,384 A * | 12/2000 | Dentinger et al. | ....... | 250/370.09 |
| 6,690,739 B1 * | 2/2004 | Mui | .............. | 375/265 |
| 7,149,355 B2 * | 12/2006 | Kubota | .......... | 382/199 |
| 7,213,128 B2 * | 5/2007 | Paver et al. | ..... | 712/22 |
| 7,373,488 B2 * | 5/2008 | Paver et al. | .... | 712/222 |
| 2006/0186311 A1 | 8/2006 | Backs et al. | | |

FOREIGN PATENT DOCUMENTS

WO 2004038483 A1 5/2004

OTHER PUBLICATIONS

Fedosseev et al., "Structured light illumination for extended resolution in fluorescence microscopy", Optics and Lasers in Engineering, vol. 43, pp. 403-414 (2005).

(Continued)

*Primary Examiner* — Yosef Kassa
(74) *Attorney, Agent, or Firm* — Caesar, Rivise, Bernstein, Cohen & Pokotilow, Ltd.

(57) ABSTRACT

A method for reconstruction of an image function (r), which represents an object function (f) of an object (1) imaged with periodically structured illumination, from optical section images ($g_c$, $g_s$), which are formed following convolution operations on the object function (f) with a modified illumination point spread function ($h_I$), comprises the steps of generating (S1) corrected optical section images ($g_c'$, $g_s'$), wherein predetermined filter operators are applied to the optical section images ($g_c$, $g_s$), said filter operators being the inverse of the convolution operations, and demodulation (S2) of the corrected optical section images ($g_c'$, $g_s'$) in order to generate the image function (r). In addition, an imaging method and an imaging apparatus are described, by means of which the aforementioned reconstruction method is applied.

21 Claims, 2 Drawing Sheets

OTHER PUBLICATIONS

Jahne, "Digitale Bildverarbeitung", pp. 281-305 (1997).
Neil et al., "Method of obtaining optical sectioning by using structured light in a conventional microscope", Optics Letters, vol. 22, pp. 1905-1907 (1997).
Schaefer et al., "Structured illumination microscopy: artefact analysis and reduction utilizing a parameter optimization approach", Journal of Microscopy, vol. 216, pp. 165-174 (2004).
International Search Report for PCT/EP2006/010374.

* cited by examiner

METHOD AND DEVICE FOR RECONSTRUCTING IMAGES

BACKGROUND OF THE INVENTION

The invention relates to methods for image processing, in particular a method for the reconstruction of images that have been recorded with a microscope using structured illumination, and an imaging method for microscopic imaging of an object. The invention also relates to devices for carrying out said methods, in particular an imaging apparatus, for example a microscope, and a reconstruction device for image reconstruction, and applications of the method.

In optical microscopy, various methods have been developed for imaging objects with resolution in depth, for example, to obtain a section image in a particular region through a sample or, by means of recording a plurality of section images, to obtain a three-dimensional representation of the sample. For example, in confocal microscopy, using confocal, point illumination and imaging, image information is gathered only in the sectional plane of interest. Disadvantages arise in confocal microscopy, in particular, due to the complex microscope configuration and the complex gathering of image information.

Another method is microscopy with structured illumination microscopy (SIM). With this wide field microscopy method, a periodic grating structure is focused onto the sectional plane of interest in the sample. By imaging the grating structure in the sectional plane, a modulation of the illumination is introduced into the coordinate space and thereby the "missing cone" problem of wide field microscopy is overcome. From a plurality of intermediate images, each of which is recorded with a different phase position of the grating structure, an image function can be calculated which represents an image of the sectional plane in the real object. Conventional microscopy with structured illumination, however, has the general disadvantage that the image reconstructed from the intermediate images represents an approximation the quality of which may be impaired, in particular, by artifacts and instabilities.

In WO 2004/038483 A1 and in the publication by L. H. Schaefer et al. ("Journal of Microscopy", vol. 216, 2004, pp. 165-174), a method for microscopy with structured illumination is described with which the image reconstruction is improved. On the basis of a reconstruction algorithm, which describes the gathering of image information using a three-dimensional model, it was proposed that, for example, brightness variations in the object illumination or occurrences of bleaching in the object that can occur over time during recording of the intermediate images, should be taken into account in the image reconstruction. In practice, however, it has been found that the quality of the image reconstruction suffers from undesirable limitations in special application cases, in particular when investigating biological samples. These are expressed therein that, for example, the details of the real sample are imaged with an insufficient level of resolution.

It is an objective of the invention to provide an improved method for image reconstruction from intermediate images of an object illuminated with structured illumination, and with which the disadvantages of conventional techniques can be overcome. It is intended, in particular, that the reconstruction method should enable an imaging of optical sections with improved spatial resolution. It is a further objective of the invention to provide an improved imaging method for obtaining images of objects with structured illumination. It is a further objective of the invention to provide a correspondingly improved imaging apparatus.

This objective is solved with the method and devices of the invention.

SUMMARY OF THE INVENTION

From the standpoint of the method, according to a first aspect, the invention is based on the general technical teaching, for the reconstruction of an image function, initially to subject optical section images that have been obtained on the basis of imaging with structured illumination to a correction with which the effect of the point spread function of the system used for illumination is compensated. Next, the image function that is sought is calculated from the corrected optical section images. The optical section images are formed, in particular, following convolutions of an object function with a modified illumination point spread function. The inventors have found that the convolutions realized during illumination of an object, which lead to blurring of structures, have been neglected in conventional methods and that the effects of the convolutions can be reversed in the corrected optical section images by deconvolution with deconvolution operators, in particular with filter operators, which are the inverse of the operations represented by the convolutions.

According to the invention, the image function may be, in particular, recorded, displayed and/or stored. A recording comprises, for example, uptake by a recording medium. Displaying comprises, for example, representation with a display device. Storing comprises, for example, placement of the image function in an image store, for example, on a hard disk, an optical data store or the like.

By means of the correction of the optical section images, the real effect of the point spread function of the illumination is compensated, so that advantageously an image function with an improved resolving power and a greater signal-to-noise ratio is achieved. The image function calculated according to the invention represents a significantly improved approximation of the real object function. A further important advantage lies therein, that without impairing the quality of the image reconstruction for structured illumination, a coarser grating structure can be used, which transmits more light and results in a still better signal-to-noise ratio.

In the present description, the "object function" (I) denotes a real amplitude of the light (e.g. transmitted, reflected or fluorescent) present in the sectional plane of interest of the object (sample) that is under investigation, said amplitude being dependent on space coordinates x and y. The "image function" (r) is the approximation (image) of the object function that is determined by means of the reconstruction according to the invention. The optical section images ($g_c$, $g_s$) are calculated from "intermediate images", which are detected using the per se known periodically structured illumination of the object with different phase positions of the grating structure. The point spread function (PSF; Fourier transform of the PSF: optical transfer function, OTF) describes the transmission of the light and possibly the image information in the optical system used for the imaging. The "illumination point spread function" describes the transmission of the light from the light source via the grating structure to the sample. The "detection point spread function" describes the transmission of the light from the sample to the camera. The term "modified illumination point spread function" denotes the PSF that is modified by the spreading of the grating structure in the axial direction (z-direction).

A further advantage of the invention lies therein that there is no limitation in relation to the design of the filter operators that are used for correcting the optical section images. In particular, any digital filter which performs the function of an at least approximate reversal of the convolution of the illumination light with the illumination point spread function or of a function derived therefrom can be used.

According to a preferred embodiment of the invention, the filter operators comprise linear, regularized inverse operators. If the filter operators act, according to a preferred variant, in Fourier space, this produces the advantage that the deconvolution can be carried out more effectively in the spatial frequency range.

According to a preferred embodiment of the invention, the reconstruction method according to the invention can be applied to optical section images immediately following their calculation in microscopic imaging with structured illumination. Advantageously, in this case, the image function that is sought is formed directly from the optical section images in that the convolution operations of the object function that are realized for the current image are reversed with the modified illumination point spread function. According to an alternative embodiment of the invention, the reconstruction method according to the invention can be applied to optical section images that have been calculated by reverse modulation from an image function obtained with a conventional technique. This variant has the particular advantage that the information content of a previously reconstructed image function can be subsequently improved.

Other preferred embodiments of the invention are disclosed below in conjunction with a mathematical description of the image reconstruction.

With regard to the method, the aforementioned objective is solved, according to a second aspect of the invention, with an imaging method for obtaining an image function of an object, wherein using periodically structured illumination of the object, a plurality of intermediate images is recorded, each with different phases of the grating structure used for illumination and, from these, optical section images are calculated, wherein the optical section images are subjected to the method for reconstruction of the image function according to the above first aspect of the invention. Using the imaging method, images resolved in depth can advantageously be provided with improved image quality.

With regard to the device, the aforementioned objective is solved, according to a further aspect of the invention, with an imaging apparatus which includes an image recording device for periodically structured illumination of the object and for detecting a plurality of intermediate images, a section image calculator for calculating optical section images from the intermediate images, and a reconstruction device for reconstructing an image function which represents an object function of the object. The reconstruction device (reconstruction circuit) contains a filter circuit for applying predetermined filter operators on the optical section images in order to generate corrected optical section images and a demodulation circuit for generating the image function from the corrected optical section images. Preferably, the reconstruction device is configured for carrying out the image reconstruction method according to the invention.

According to a preferred embodiment of the invention, the imaging apparatus is an optical microscope with structured illumination, which is equipped with the reconstruction device. The reconstruction device is an independent subject of the invention. Advantageously, a conventional microscope can easily be retrofitted with structured illumination with the reconstruction device.

Further independent subjects of the invention are a computer program product on an electronic, magnetic or optical storage medium with a program code for carrying out the reconstruction method according to the invention, and the storage medium which contains program instructions for carrying out the reconstruction method according to the invention.

BRIEF DESCRIPTION OF SEVERAL VIEWS OF THE DRAWINGS

Further details and advantages of the invention will now be described making reference to the accompanying drawings, in which.

DETAILED DESCRIPTION OF PREFERRED EMBODIMENTS

The invention will be described below making reference to the implementation of the reconstruction of the image function. Details of image recording with a microscope with structured illumination are known per se and will therefore not be described here.

Figure 1:
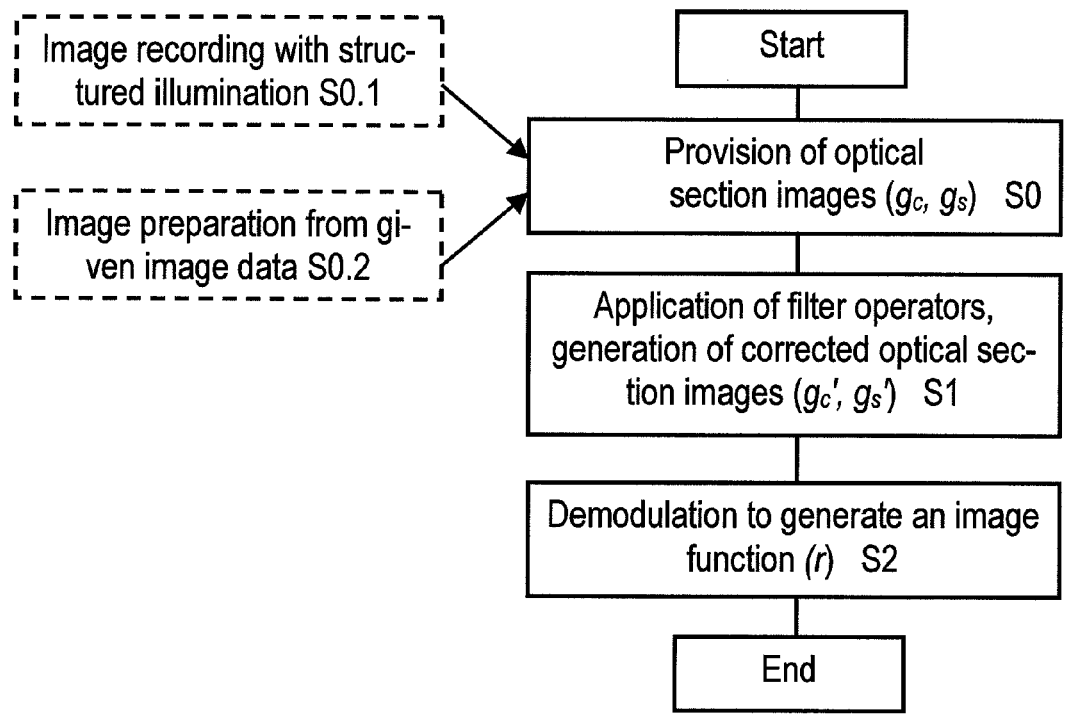
FIG. 1 shows a flow diagram to illustrate an image reconstruction method according to one embodiment of the invention.

FIG. 1 illustrates, in steps S0 to S2, a sequence of the reconstruction method according to the invention, the details of which are described below in relation to the imaging method according to the invention. The optical section images which are the starting point of the reconstruction can be calculated directly from intermediate images of an image recording with structured illumination. In this case, the imaging method according to the invention is realized in steps S0.1 to S2. Alternatively, the optical section images can be provided through image preparation from previously recorded and stored intermediate images or reconstructed image functions, in order to apply the reconstruction method to previously provided image data (steps S0.2 to S2).

In the imaging method S0.1 to S2 according to the invention, image recording initially takes place as in conventional techniques using the method of structured illumination. During the image recording, in a first partial step, a plurality of intermediate images $g_i$ are initially detected.

Using a grating structure $s_i$, which is characterized by a spatial frequency $\omega$ and a phase $\phi$ and can be described as $$s_i(x,z) = \delta(z)[1 + m\cos(\omega x + \phi_i)] \tag{1}$$

the intermediate images $g_i$ are represented by the coordinates $\hat{x}_k = (x_k, y_k, z_k)$ and the differentials $d\hat{x}_k = dx_k dy_k dz_k$, as described by L. H. Schaefer et al. in "Journal of Microscopy" (see above), such that:

$$g_i(\underline{x}) = \iiint f(x_1) h_D(\underline{x} - \underline{x}_1)|^2 \times \iiint s_i(x - x_0, z - z_0 - z_1)|h_I(x_0)|^2 dx_0 dx_1 \tag{2}$$

or, simplifying $$g_i = h_D*(f \cdot [h_I*s_i]) = g_w + g_c \cos\phi_i + g_s \sin\phi_i \tag{3}$$

In equation (3), $g_w$ denotes the conventional m field image and $g_c$, $g_s$ denote optical section images. $h_I$ and $h_D$ are the illumination and detection point spread functions.

If at least three intermediate images $g_i$ are recorded with different phases $\phi$, from equation (3), an equation system is obtained from which, in a further partial step, the optical section images $g_c$, $g_s$ are calculated separately. The optical section images $g_c$, $g_s$ are provided as input variables of the reconstruction method according to the invention (step S0).

In the conventional technology, the reconstruction of the image function $f$ being sought took place on the basis of approximations according to $g_c(\underline{x}) \approx [f \cos(\omega x)]$ and $g_s(\underline{x}) \approx -[f \sin(\omega x)]$. However, the inventors have determined the limited quality of these approximations. The optical section images $g_c$, $g_s$ are formed in the real optical system after convolution operations on the object function ($f$) with a modified illumination point spread function ($h_I$). According to a preferred embodiment of the invention, these convolutions can be written with the above grating structure (1) as follows $$g_c(\underline{x}) = (f(\underline{x})\cos(\omega x))*(v(z)|h_D(\underline{x})|^2)$$

$$g_s(\underline{x}) = (f(\underline{x})\cos(\omega x))*(v(z)|h_D(\underline{x})|^2) \quad (4)$$

where $v(z) = \int \cos(\omega x_1) [\int |h_I(x_1, y_1, z)|^2 dy_1] dx_I$.

According to modified embodiments of the invention, the expression $v(z)$ can be replaced by other modifications of the illumination point spread function that are given by the actual physical optical system.

According to the invention, in step S1, filter operators are applied to the detected optical section images ($g_c$, $g_s$) in order to determine corrected optical section images ($g_c'$, $g_s'$) Instead of the aforementioned simple conventional approximation, for the object function $f$, the corrected optical section images are provided, which preferably have been calculated with the filter operators according to:

$$g_c' = F^{-1}\left\{\frac{H_D * G_C}{|H_D|^2 + \beta}\right\} = f\cos(\varpi x) \text{ and} \quad (5)$$

$$g_s' = -F^{-1}\left\{\frac{H_D * G_S}{|H_D|^2 + \beta}\right\} = f\sin(\varpi x)$$

wherein
$H_D = F\{v|h_D|^2\}$ $G_C = F\{g_c\}$, $G_S = F\{g_s\}$ and $\beta$ is a predetermined regularization parameter.

The filter operators described, which are used separately on the section images, are regularized inverse filters with the Tikhonov regularization, which is used here by way of example. The equations (5) describe the inverse filter with which the convolution operations (4) are reversed, so that a new and better approximation is produced for the object function $f$. Due to the displacement property of the Fourier transform, the negative effect of the "missing cone" problem in wide field microscopy is made ineffective. In the expressions (5), no axial spatial frequencies occur in the coordinate origin, for which $H_D$ has very small values. As an alternative to the regularized inverse filter, any other deconvolution method can be applied in order to calculate the corrected optical section images.

The regularization parameter $\beta$ can be determined either empirically or with numerical methods for every concrete application of the invention (for example, with the "generalized cross validation"). A setting of $\beta$ can also be provided depending on at least one property of the optical section images ($g_c$, $g_s$), such as for example, depending on faults in the section images due to noise. The reconstruction can be carried out repeatedly with respectively changed regularization parameters to optimize the image function.

Thereafter, in step S2, a demodulation is carried out for reconstruction of the resultant image (of the image function being sought), wherein the image function (r) is calculated according to $$r = \sqrt{g_c'^2 + g_s'^2} \quad (6)$$

or as a heterodyne demodulation according to $$r = [g_c' + jg_s']e^{j\omega x} \quad (7)$$

The heterodyne demodulation involves a linear calculation and is therefore used preferentially. Alternatively, other demodulation procedures can be used to obtain the image function from the corrected section images, as per se known (see e.g. WO 2004/038483 A1)

If, according to an alternative embodiment of the invention, in order to provide the optical section images, previously recorded intermediate images or reconstructed image functions are processed, the reconstruction takes place along the lines of the above steps. For example, from a stored image function r', firstly the section images can be calculated and these can then be subjected to a correction by means of the filtration, and subsequently subjected once more to the demodulation. The stored image function r' may have been reconstructed with a conventional technique or according to the invention. In the latter case, the renewed reconstruction can take place, for example, with an amended parameter $\beta$.

Figure 2:
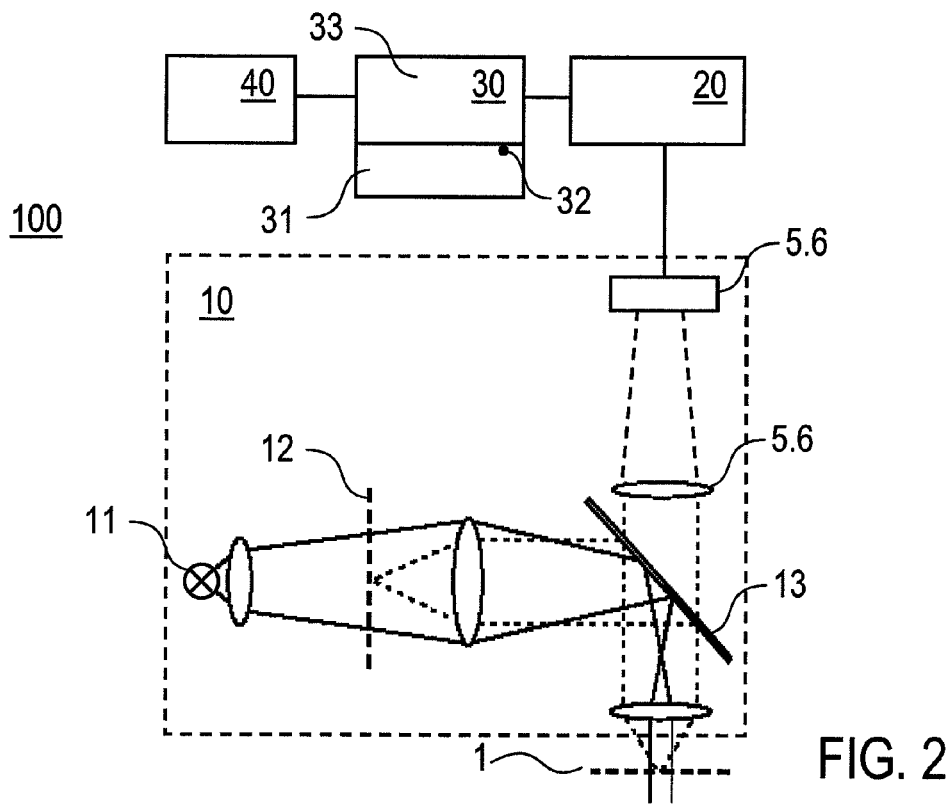
FIG. 2 shows a schematic illustration of an imaging apparatus according to one embodiment of the invention.

The imaging apparatus 100 according to the invention for obtaining the image function r of an object 1 comprises, according to FIG. 2, an image recording device 10 for periodically structured illumination of the object 1 and for detection of a plurality of intermediate images $g_I$, a section image calculator 20 for determining the optical section images $g_c$, $g_s$ from the intermediate images $g_I$, and a reconstruction device 30 for reconstructing the image function r, which represents an object function $f$ of the object 1. Optionally, a control and display device 40 is also provided. The components 20 to 40 can be provided by one or more computers.

The image recording device 10 comprises a light source 11, a movable grating structure 12, a semi-reflecting mirror 13, optical components 14 and a camera 15. These components are known per se from optical imaging systems with structured illumination and are implemented, for example, in a microscope of the ApoTome type (from Carl Zeiss AG).

The section image calculator 20 is, for example, a computer circuit with which the aforementioned equation system (3) for determining the optical section images $g_c$, $g_s$ is solved.

The reconstruction device 30 comprises a filter circuit 31 for applying the filter operators (5) to the optical section images and for generating the corrected optical section images $g_c'$, $g_s'$ and a demodulation circuit 33 for calculating the image function r from the corrected optical section images according to (6) or (7). The filter circuit 31 may have a schematically illustrated adjusting element 32 for adjusting the regularization parameter $\beta$. The adjusting element 32 can be set up for manual or electronic adjustment (e.g. with the control and display device 40).

Figure 3:
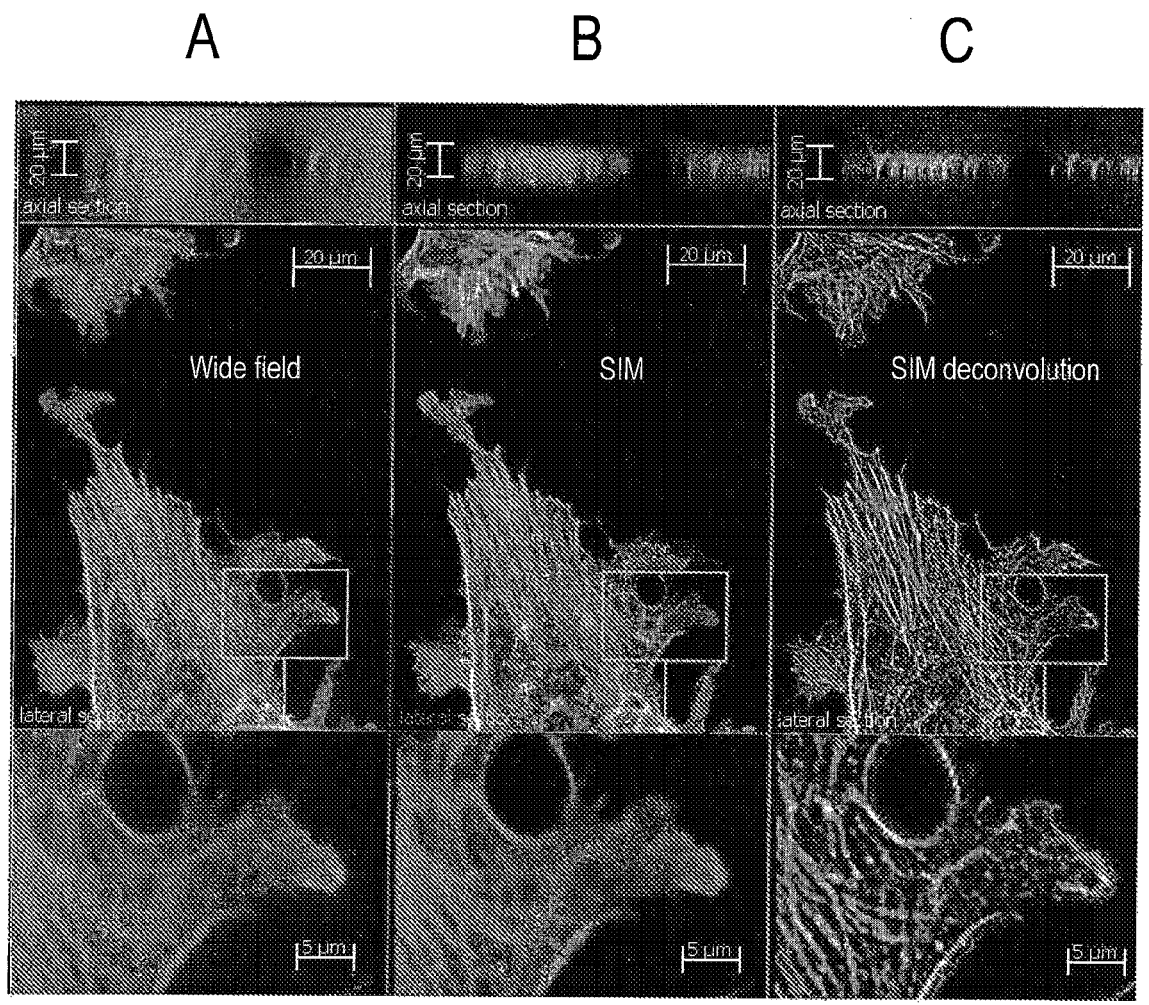
FIG. 3 shows example images, which illustrate the quality gain obtained with the invention.

FIGS. 3A to 3C illustrate in exemplary manner the improvement in the resolving power in the imaging of a biological cell (using, for illustration, actin-microtubules). The figures show the axial resolution (top), a section of the image (middle) and an enlarged partial section (bottom). The images obtained with conventional wide field microscopy (FIG. 3A) and with conventional SIM technology (FIG. 3B) show only coarse outlines of the cell, whereas the reconstructed image function (FIG. 3C) with deconvolution of the optical sections has a substantially improved lateral resolution and makes it possible to recognize numerous details.

The features of the invention disclosed in the above description, the figures and the claims can be equally significant for realizing the invention in its different embodiments, either individually or in combination.

The invention claimed is:

1. A method for reconstruction of an image function (r), which represents an object function (f) of an object (1) imaged with periodically structured illumination, from optical section images ($g_c$, $g_s$) which are formed after convolution operations on the object function (f) with a modified illumination point spread function ($h_I$), said method comprising:
   generation of corrected optical section images ($g_c'$, $g_s'$), wherein predetermined filter operators that are the inverse of the convolution operations are applied on the optical section images ($g_c$, $g_s$), and
   demodulation (S2) of the corrected optical section images ($g_c'$, $g_s'$) in order to generate the image function (r).

2. The method according to claim 1 wherein the filter operators comprise linear, regularized inverse filter operators.

3. The method according to claim 1, wherein the filter operators are constructed from Fourier transforms of the optical section images ($g_c$, $g_s$) and the modified illumination point spread function ($h_I$).

4. The method according to claim 1, wherein the optical section images ($g_c$, $g_s$) are formed after convolution operations defined by $$g_c(\underline{x})=(f(\underline{x})\cos(\omega x))*(v(z)|h_D(\underline{x})|^2) \text{ and}$$

$$g_s(\underline{x})=-(f(\underline{x})\sin(\omega x))*(v(z)|h_D(\underline{x})|^2)$$

wherein ($h_D$) is a detection point spread function and $v(z)=\int \cos(\omega x_1)[\int |h_I(x_1, y_1, z)|^2 dy_1]dx_1$.

5. The method according to claim 4, wherein the corrected optical section images ($g_c'$, $g_s'$) are calculated with filter operators defined by:

$$g_c' = f\cos(\omega x) = F^{-1}\left\{\frac{H_D * G_C}{|H_D|^2 + \beta}\right\} \text{ and}$$

$$g_s' = f\sin(\omega x) = -F^{-1}\left\{\frac{H_D * G_S}{|H_D|^2 + \beta}\right\},$$

where $H_D=F\{v|h_D|^2\}$, $G_C=F\{g_c\}$, $G_S=F\{g_s\}$, wherein $\beta$ is a predetermined regularization parameter.

6. The method according to claim 5, comprising the step:
   setting the regularization parameter $\beta$ depending on at least one property of the optical section images ($g_c$, $g_s$).

7. The method according to claim 6, wherein the regularization parameter $\beta$ is set depending on a noise parameter of the optical section images ($g_c$, $g_s$).

8. The method according to claim 1, wherein, for demodulation of the corrected optical section images ($g_c'$, $g_s'$), the image function (r) is calculated according to $r=\sqrt{g_c'^2+g_s'^2}$.

9. The method according to claim 1, wherein, for demodulation of the corrected optical section images ($g_c'$, $g_s'$), the image function (r) is calculated according to $r=\lfloor g_c'+jg_s'\rfloor e^{j\omega x}$.

10. The method according to claim 1, wherein the optical section images ($g_c$, $g_s$) are formed immediately following recording of an image.

11. The method according to claim 1, wherein the optical section images ($g_c$, $g_s$) are determined by reverse modulation from an uncorrected image function (r').

12. An imaging method for obtaining an image function (r) of an object, comprising the steps:
   periodically structured illumination of the object (1),
   detection of a plurality of intermediate images (g'),
   determination of optical section images ($g_c$, $g_s$) from the intermediate images ($g_i$), and
   reconstruction of the image function (r) with a method according to claim 1.

13. An imaging apparatus for obtaining an image function (r) of an object, which comprises:
   an image recording device for periodically structured illumination of the object and for detection of a plurality of intermediate images (g'),
   a section image calculator for determining optical section images ($g_c$, $g_s$) from the intermediate images ($g_i$), and
   a reconstruction device for reconstructing an image function (r) which represents an object function (f) of the object, from the optical section images ($g_c$, $g_s$), wherein the reconstruction device comprises a filter circuit for applying predetermined filter operations on the optical section images ($g_c$, $g_s$) in order to generate corrected optical section images ($g_c'$, $g_s'$) and a demodulation circuit for generating the image function (r) from the corrected optical section images ($g_c'$, $g_s'$).

14. The imaging device according to claim 13, wherein the reconstruction device is configured to carry out a reconstruction method according to claim 1.

15. The imaging device according to claim 13, wherein the filter circuit comprises an adjusting element for adjusting the regularization parameter $\beta$.

16. The imaging device according to claim 13, wherein the image recording device is part of an optical microscope.

17. A microscope, which comprises an imaging apparatus according to claim 13.

18. A reconstruction device for reconstruction of an image function (r), which represents an object function (f) of an object, from optical section images ($g_c$, $g_s$), comprising:
   a filter circuit for applying predetermined filter operators on the optical section images ($g_c$, $g_s$) in order to generate corrected optical section images ($g_c'$, $g_s'$), and
   a demodulation circuit for generating the image function (r) from the corrected optical section images ($g_c'$, $g_s'$).

19. A microscope, which comprises a reconstruction device according to claim 18.

20. A computer program product situated on a computer-readable storage medium and having a program code for carrying out a reconstruction method according to claim 1.

21. A device which comprises a computer-readable storage medium which contains program instructions for carrying out a reconstruction method according to claim 1.

* * * * *